US006968539B1

(12) United States Patent
Huang et al.

(10) Patent No.: US 6,968,539 B1
(45) Date of Patent: Nov. 22, 2005

(54) METHODS AND APPARATUS FOR A WEB APPLICATION PROCESSING SYSTEM

(75) Inventors: Yun-Wu Huang, Chappaqua, NY (US); Robert David Johnson, Ridgefield, CT (US); Sean James Martin, Boston, MA (US); Simon L. Martin, Oxford (GB); Moshe Morris Emanuel Matsa, Cambridge, MA (US); Roger A. Pollak, Pleasantville, NY (US); John J. Ponzo, Cortlandt Manor, NY (US); Ronald So-tse Woan, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 999 days.

(21) Appl. No.: 09/633,037

(22) Filed: Aug. 4, 2000

Related U.S. Application Data

(60) Provisional application No. 60/156,872, filed on Sep. 30, 1999.

(51) Int. Cl.[7] ............................................... G06F 9/44
(52) U.S. Cl. ..................................................... 717/115
(58) Field of Search ....................... 717/139, 115, 114, 717/136, 106, 143

(56) References Cited

U.S. PATENT DOCUMENTS

| 6,101,539 | A | * | 8/2000 | Kennelly et al. | 709/223 |
| 6,144,991 | A | * | 11/2000 | England | 709/205 |
| 6,275,938 | B1 | * | 8/2001 | Bond et al. | 713/200 |
| 2003/0154279 | A1 | * | 8/2003 | Aziz | 709/225 |
| 2004/0187080 | A1 | * | 9/2004 | Brooke et al. | 715/522 |

OTHER PUBLICATIONS

Goschnick, Steve B; Design and Development of Melbourne IT Creator—a System for Authoring and Management of Online Education, p. 187-201, 1998 IEEE, retrieved Feb. 17, 2005.*
Hildyard, Alexander, "An XML Document to JavaScript Object Converter", p. 63-69, ProQuest Computing Jan. 1999, retrieved Feb. 17, 2005.*
Lie, Hakon Wium; Saarela, Janne; "Multipurpose Web Publishing", p. 95-101, Oct. 1999, Communications of the ACM, retrieved Feb. 17, 2005.*
Price, Roger, "Beyond SGML", p. 172-181, 1998 ACM, retrieved Feb. 17, 2005.*

* cited by examiner

Primary Examiner—Tuan Dam
Assistant Examiner—Mary Steelman
(74) Attorney, Agent, or Firm—Douglas W. Cameron; Ryan, Mason & Lewis, LLP

(57) ABSTRACT

A software system is provided to allow a computer to install and process web applications according to the invention. Such web applications are written as web pages that have access to the full range of operating system resources, including those not accessible through a web browser. Preferably, a web application is built using three types of languages used for constructing web pages, namely: (a) a visual presentation language; (2) a data modeling language; and (3) a scripting language for embedding logic. The software system preferably comprises a web application manager, an operating system interface module, a scripting language interpreter, and optionally a web browser and/or a data modeling language processor. Various other features such as data caching and security filtering are provided in accordance with such a system.

10 Claims, 12 Drawing Sheets

METHODS AND APPARATUS FOR A WEB APPLICATION PROCESSING SYSTEM

The present application claims priority to the U.S. provisional patent application identified by Ser. No. 60/156,872 filed on Sep. 30, 1999, the disclosure of which is incorporated by reference herein.

FIELD OF THE INVENTION

The present invention relates generally to the field of software systems that manage the life-cycle of software applications, e.g., installation, configuration, resource management, security management, execution, and de-installation, and, more particularly, to methods and apparatus for processing of web applications that are written in the form of web pages which can be downloaded through the Internet using web communication protocols, installed in local computers, and executed utilizing web components, such as a web browser and JavaScript™ interpreter, in the local computers.

BACKGROUND OF THE INVENTION

The recent explosion of the popularity of the World Wide Web ("Web" for short, and hereinafter referred to in the lower case as "web" in the context of an adjective or adverb, e.g., web pages) has made the Internet one of the most important media for mass communication. The Web is used for many applications such as information retrieval, personal communication, and electronic commerce and has been rapidly adopted by a fast growing number of Internet users in a large part of the world.

Using the Web, users can access remote information by receiving web pages through the Hypertext Transfer Protocol (HTTP). The information in a web page is described using the Hypertext Markup Language (HTML) and eXtensive Markup Language (XML), and is displayed by software called web browser. Web pages of earlier design are considered static because they do not include any logic that can dynamically change their appearances or provide computations based on user input. Subsequently, the Java™ (Sun Microsystems) programming language was incorporated in web pages in the form of applets. An applet is a small Java™ program that can be sent along with a web page to a user. Java™ applets can perform interactive animation, immediate calculations, or other simple tasks without having to send a user request back to the server, thereby providing the dynamic logic in web pages.

Java™ is an object-oriented programming language which can be used for creating stand-alone applications. Writing Java™ programs typically requires different and more extensive skills and training than composing web pages. The learning curve for writing Java™ programs is typically longer than that for writing web pages. Not all web page authors therefore are expert Java™ programmers.

Recently, to make it easier to embed logic in web pages, an easy-to-write script language called JavaScript™ (Sun Microsystems) has been supported by popular web browsers to be incorporated into web pages. JavaScript™, capable of embedding logic for computation based on user input, brings dynamic and powerful capabilities to web pages. JavaScript™, unlike Java™ which is a full-fledged programming language, has a simpler syntax and is much easier to learn. Because of this easy-to-write feature, JavaScript™ has currently become a popular way to embed logic in web pages by many web page authors.

Although JavaScript™ brings easy-to-write logic to web pages, it is limited to browser functions and works with HTML elements only. It can only be used to create simple applications under the contexts of the browser, such as changing the web page's visual presentation dynamically and computing user input quickly without sending a user request back to the server (for such computation). Thus, web pages with JavaScript™ logic cannot be used to create stand-alone applications that require access to a full range of resources on the user's computer such as the file system management and the display area beyond the browser's window. In general, web pages cannot be processed in non-browser contexts.

At the present, stand-alone applications are typically written in traditional programming languages (also called 3GL for 3rd Generation Languages) such as C, C++, and Java™, or Fourth Generation Languages (4GL) such as Visual Basic™. Through these languages, stand-alone applications interact directly with operating systems through operating system APIs (application programming interfaces) or indirectly with library functions which may in turn call these operating system APIs. The capability of accessing the operating system APIs gives an application the control of computing resources in a computer.

If web pages had embedded logic that could access a whole range of computing resources enabled by these operating system APIs, they could then be used to develop stand-alone applications just like any of the aforementioned 3GL and 4GL languages. Using web pages to develop stand-alone applications would have many advantages. First, web page authors who do not possess the skill and experience in writing 3GL/4GL applications could develop stand-alone applications using the web page technology they profess.

Secondly, the web technology components that can process the visual presentation language (e.g., HTML), the data modeling language (e.g., XML), and the communication protocol (e.g., HTTP) are available in most computers, which can connect to the Internet through the Web. This would provide an advantage in that using web pages to develop applications, a developer could very efficiently integrate these components. This is because, whereas 3GL/4GL applications can integrate these components programmatically, web pages could integrate them declaratively through languages such as HTML and XML. In general, the shorter learning curve and development time of web pages, as compared with 3GL/4GL programs, would result in a shorter time and lower cost in the development of software applications. The present invention addresses this issue by providing methods and apparatus in a software system that manage the life-cycle of software applications, which are composed of web pages that are not limited to the browser contexts and that have access to the full range of operating system resources.

Another issue of the processing of computer software addressed by the present invention is the software installation process. Typically, the installation of a software application is achieved by a special-purpose program which comes with this software and is written only for the purpose of installing this software. This is evident in the existence of a "setup.exe" or "install.exe" program in almost all software packages for PCs (personal computers). This method of software installation means that developers for each software application have to write a specific install program just to install their software.

In general, an install program for an application needs to configure a list of settings that are used to establish a proper environment or context for this application before it can be properly installed. These settings may include, for example, the basic operating system setup such as the registry entries, location setup such as the directory or folder in which the application is to be stored, link setup such as the short-cut link to this application, the graphic setup such as the icon of this application, and the dependency setup such as other applications that this application depends on for execution.

To properly setup each setting, e.g., one of the aforementioned settings, the install program typically takes the determined value of this setting and processes an action specific to this setting. For example, the registry entry setup action may be to add the determined registry entry values to the proper registry files, whereas the dependency setup action may be to investigate if all applications that the application to be installed depends on are already installed and, if not, to display an error message. Typically, the value of a setting is either determined by user input during the installation process, such as the directory where the application is to be stored, or predetermined by the install program, such as the list of applications that its application depends on.

In general, an install program first configures each setting by determining its value (by user input or pre-configuration) and then invokes the setup action for this setting. Because applications may have a different set of pre-configured setting values, each application requires a unique install program. Furthermore, if a new version of an application changes the value of one of its install settings, such as a new icon, the install program for this application has to be rewritten to incorporate this new value.

It would be advantageous to the application developers if they did not need to write a new install program for each new version of an application they develop. Instead, it would be desirable, for each version of an application, to construct a list of install settings with pre-configured values for this application using a data modeling language such as XML, which could be provided together with this application for installation. This way, a standardized install program would then be deployed by the user's computer to decode the install settings and values and conduct proper installation for this application based on these values. This standardized install program could then be used to install all applications whose install settings and values are modeled by a language understood by this install program. With many applications installed using a standardized install program, the users would also have a consistent experience in the installation process for all these applications.

The present invention addresses this issue by providing methods and apparatus of software installation in which a standardized install manager exists in a computer system to perform the installation process for all software applications whose install settings and values are modeled by a language understood by this install program.

Yet another issue of today's computer software addressed by the present invention is the security management of software applications. Traditional stand-alone applications based on programming languages such as C and C++ typically have access to all the operating system resources through the calling of operating system APIs. In this case, the security context, i.e., the limit of system resource access, for these applications is the entire system. Based on this security context, it is possible that an application can, inadvertently or maliciously, damage not only its own data but those of other applications that share the same computer system.

In a virtual machine environment, such as the Java™ Virtual Machine, the security context of an application (such as a Java™ program) is defined by the virtual machine. A misbehaving application thus can only create external damage allowable by the virtual machine. However, there can be many different types of applications running on the same virtual machine and while each one of them may have a different security need, they are forced to run under the same security context (that defined by the virtual machine).

It would be advantageous if each application had its own security context that is predetermined by the system management policy. Thus, based on its level of security risk, an application could be associated with a security context which regulates the system resources to which this application can or cannot access. This way, a misbehaving program in an application with a restrictive security context would cause minimum damage to the system as a whole. The present invention addresses this issue by providing methods and apparatus of a computer system in which each application has its own security context.

Yet another issue of today's computer software addressed by the present invention is the web cache system for software applications. Web caching is traditionally performed by the web browsers and web proxies whose primary tasks include transmitting web objects over the network. Web pages in the context of a web browser contain hyperlinks to web objects through textual or graphic anchors. The user requests a web object from a web page when this page is displayed by the web browser and the user selects, through the mouse or other pointing mechanism, the anchor of this object.

When a web object is requested through a web browser with the web caching feature, the web browser first checks to see if the object exists in its cache. If so, this object in the browser's cache is returned to the request web page. If the object does not exist in the browser's cache, the browser uses the Uniform Resource Locator (URL) of this object to locate its location in the Internet and retrieves it through a data transfer protocol such as HTTP. When the browser receives this object, it typically displays this object while storing a copy in its cache.

Applications accessing web objects could be composed using web pages. However, if web pages are processed in the context of the browser, the web objects requested by them in a client computer can only be cached by the browser in the computer. In other word, in a client computer, web page based applications under the browser contexts use only the browser's cache for web caching.

Different web applications however may access web objects with different characteristics. For example, one web application may access web objects that rarely change over time whereas another may access web objects that change highly frequently. It would be advantageous to deploy a sizable space to cache static web objects for the first application while little or no space for the second because any cached objects will be outdated immediately. In general, it would be advantageous that each application has its own web cache.

Furthermore, traditional web caching by browsers only cache web objects of certain types that are defined in HTTP. Some applications may need to retrieve objects from the Web with types not defined in HTTP. Examples of object types not defined by HTTP may include executable files, spreadsheet files, and documents with proprietary structures. Caching these non-HTTP-defined objects could provide a performance advantage to applications that retrieve objects of these types through the Web.

The present invention addresses the issue of web caching for applications by providing methods and apparatus to provide each web application a separate cache for both the HTTP-defined and non-HTTP-defined objects from the Web.

SUMMARY OF THE INVENTION

In accordance with the aforementioned needs, the present invention is directed to a system in which applications are written as web pages that have access to the full range of operating system resources, including those not accessible through the web browser. The applications described in the present invention are called web applications. In a preferred embodiment of the present invention, three types of languages used for constructing web pages are used for building web applications. They are: (1) a visual presentation language; (2) a data modeling language; and (3) a scripting language for embedding logic. Those skilled in the art will appreciate that currently the three most commonly used languages in web pages are HTML for visual presentation, XML for data modeling, and JavaScript™ for scripting.

According to the present invention, a software system is provided to allow a computer to install and process web applications. This system preferably comprises a web application manager, an operating system interface module, a scripting language interpreter, and optionally a web browser and/or a data modeling language processor. The web application manager manages the life-cycle for applications, which may include the installation, execution, de-installation of these applications, as well as the security control and web caching for these applications. The script language interpreter (such as the JavaScript™ interpreter) parses and interprets the scripting language embedded in the web pages. The operating system interface module is used to convert the scripting language calls that request access to system resources into appropriate native operating system APIs. The web browser can be used to display the content of web applications and transfer data based on the data transfer protocol deployed by the browser (such as HTTP). The data modeling language processor (such as the XML parser) decodes the contents in the web applications that are written in the data modeling language (such as XML).

According to the present invention, a software system is provided to allow a computer to install and process web applications. This system preferably comprises a web application manager, an operating system interface module, a scripting language interpreter, and optionally a web browser and/or a data modeling language processor. The web application manager manages the life-cycle for applications, which may include the installation, execution, de-installation of these applications, as well as the security control and web caching for these applications. The script language interpreter (such as the JavaScript interpreter) parses and interprets the scripting language embedded in the web pages. The operating system interface module is used to convert the scripting language calls that request access to system resources into appropriate native operating system APIs. The web browser can be used to display the content of web applications and transfer data based on the data transfer protocol deployed by the browser (such as HTTP). The data modeling language processor (such as the XML parser) decodes the contents in the web applications that are written in the data modeling language (such as XML).

According to one feature of the present invention, the scripting language used in Web pages that are typically restricted to the web browser functions can be extended to include function calls that access system resources normally beyond the limit of browser functions. Those skilled in the art will appreciate that screen display outside of the browser window and general file system management are two examples of the types of system resources beyond browser's control.

According to yet another feature of the present invention, the operating system interface module can accept an extended scripting language function call that access operating system resources beyond the browser contexts and, based on the type of this function call, execute code that includes calls to the native operating system APIs.

According to yet another feature of the present invention, the Web application manager can manage installation for all web applications by invoking its install manager module. To install a web application, the install manager first obtains a copy of this application and the install document associated with this application. In a preferred embodiment of the present invention, the install manager can obtain the application and its install document by a network download process through the Web or other data transfer protocols. The install document for a web application contains a set of install settings and their values, which are modeled in language understood by the install manager. The install document for a web application can be written by the creator of this application. When installing this application, the install manager decodes the settings and their values in the install document of this application, and configures each setting based on its value accordingly.

According to yet another feature the present invention, the web application manager can conduct security control for a web application based on the security context of this application. According to the present invention, the security context of a web application is the limits of access to the operating system resources this application is restricted to. The security context of an application can be modeled with a list of security settings for this application. Each security setting regulates the behavior of its host application in terms of a specific security feature. In a preferred embodiment of the present invention, the security context of a web application can be pre-configured by the creator or supplier of this application, and obtained by the user together with its application when this application is downloaded for installation. In this preferred embodiment, the security context of a web application can also be modified by the administrator of a software system in which this application is deployed. According to the present invention, when a web application is being executed, the web application manager can check each setting in the security context of this application to ensure that no security rules, based on the settings configured in the security context of this application, are violated at any time while this application is running.

According to yet another feature of the present invention, the web application manager can create a web cache for each application it installs. The cacheable web objects include both the HTTP-defined objects and non-HTTP-defined ones. In a preferred embodiment of the present invention, the two types of web objects can be stored in two different pools of the same cache for an application. The settings of the cache for an application can be pre-configured and obtained together with this application by a client computer. They can also be modified by the administrator of the system in which their application is installed.

According to yet another feature of the present invention, the scripting language used in web pages that are typically restricted to the web browser functions can be extended to include function calls that manage the web cache for each application. Those skilled in the art will appreciate that typical cache APIs may include the search, insertion, and deletion of an object, as well as the reset of the whole cache.

According to yet another feature of the present invention, when the web application manager executes an extended cache management API for a Web application, it checks the cache settings for this application and may take proper cache management action to ensure that these cache settings are not violated.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
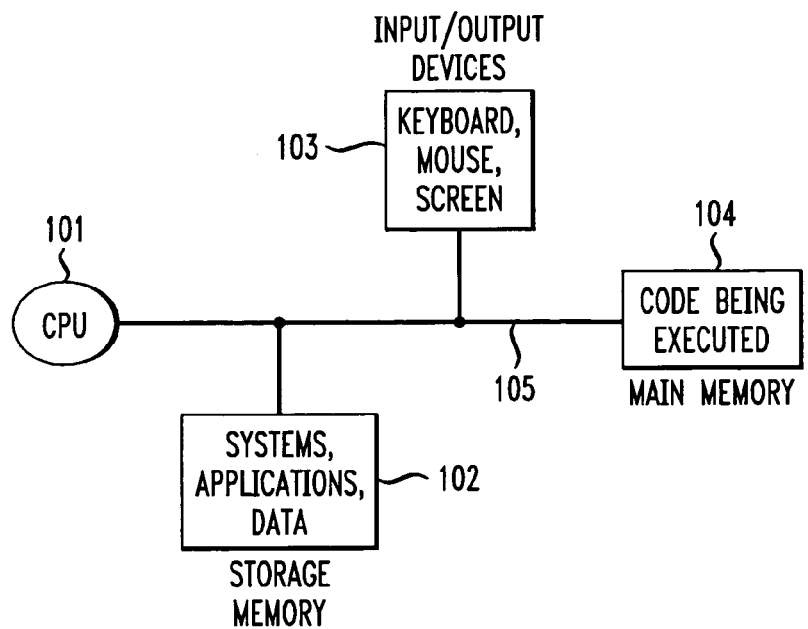
FIG. 1 is an example of an architecture of a server or a client of the present invention.

Referring initially to FIG. 1, an example is shown of a computing device that is capable of implementing the features of the present invention. This computing device can be, for example, a PC (personal computer), a workstation, or a mainframe, and may typically include elements such as: one or more processors, e.g., CPUs (central processing units) 101; input and output devices 103 such as a keyboard, a mouse and a screen monitor; main memory 104 such as RAM (random access memory); and storage memory 102 such as disks. These elements are interconnected through a bus 105 on which information can travel. As is known, the main memory 104 stores code being executed by the CPU and the storage memory 102 serves as the permanent storage for the systems (such as the operating system), the applications (such as the software system of the present invention), as well as the data.

More generally, it is to be appreciated that the term "processor" as used herein is intended to include any processing device such as, for example, one that includes a CPU (as illustrated in FIG. 1) and/or other processing circuitry. The term "memory" as used herein is more generally intended to include memory associated with a processor or CPU, such as, for example, RAM (as illustrated in FIG. 1), ROM, a fixed memory device such as a hard disk (as illustrated in FIG. 1), a removable memory device (e.g., diskette), flash memory, etc. In addition, the term "input and output devices" as used herein is more generally intended to include any computer-based input and output devices, for example, one or more input devices, e.g., keyboard and mouse (as illustrated in FIG. 1), for entering data to the processing unit, and/or one or more output devices, e.g., display monitor (as illustrated in FIG. 1) and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 2:
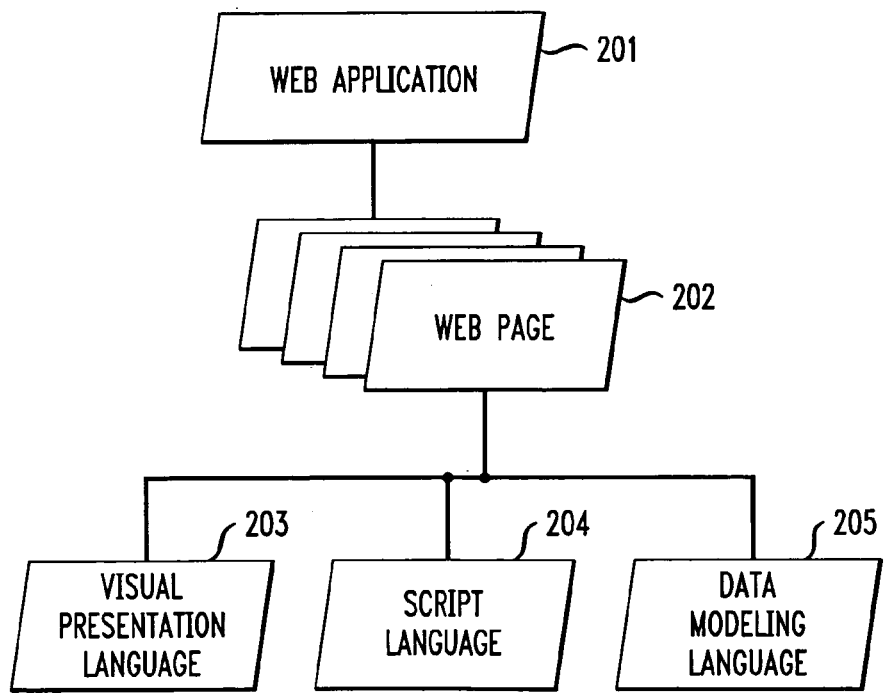
FIG. 2 is an example of an architecture of a web application of the present invention.

Referring now to FIG. 2, an example is shown of a web application of the present invention. As shown, a web application 201 comprises one or more web pages 202. In a preferred embodiment of the present invention, each web page 202 of a web application 201 contains text composed in any combinations of three types of languages: a visual presentation language 203, a script language 204 and a data modeling language 205.

The visual presentation language is used to provide a graphic user interface (GUI) on the browser window. It can be used to visually present the text or linked objects (such as a voice or a graphic file), to receive user input, and transfer data to and from a remote host through web browser. Those skilled in the art will appreciate that currently the most commonly used visual presentation language for browsers is HTML and the data transfer protocol used by browsers is HTTP.

The script interpreter is used to parse and interpret the text of the web page that is written in a script language. Those skilled in the art will appreciate that currently the most commonly used script language in web pages is JavaScript. Script in a web page provides a way to embed logic that creates dynamic visual displays or conducts immediate computations when its web page is processed. Traditional script language used in web pages is limited to the browser functions and HTML elements. According to a feature of the present invention, the script language used in a web application of the present invention can be extended to contain function calls that have access to a full range of operating system resources, including those beyond the browser contexts (details depicted in FIGS. 4 and 8).

The data modeling language is used to describe certain data in web applications such that their structures and definitions of data elements inside them can be easily applied by other applications that understand the same language and uses the same definitions for data elements. This way no specialized code is needed to decode data received from other applications. Those skilled in the art will appreciated that currently the most common language used for data modeling on the Web is XML.

Figure 3:
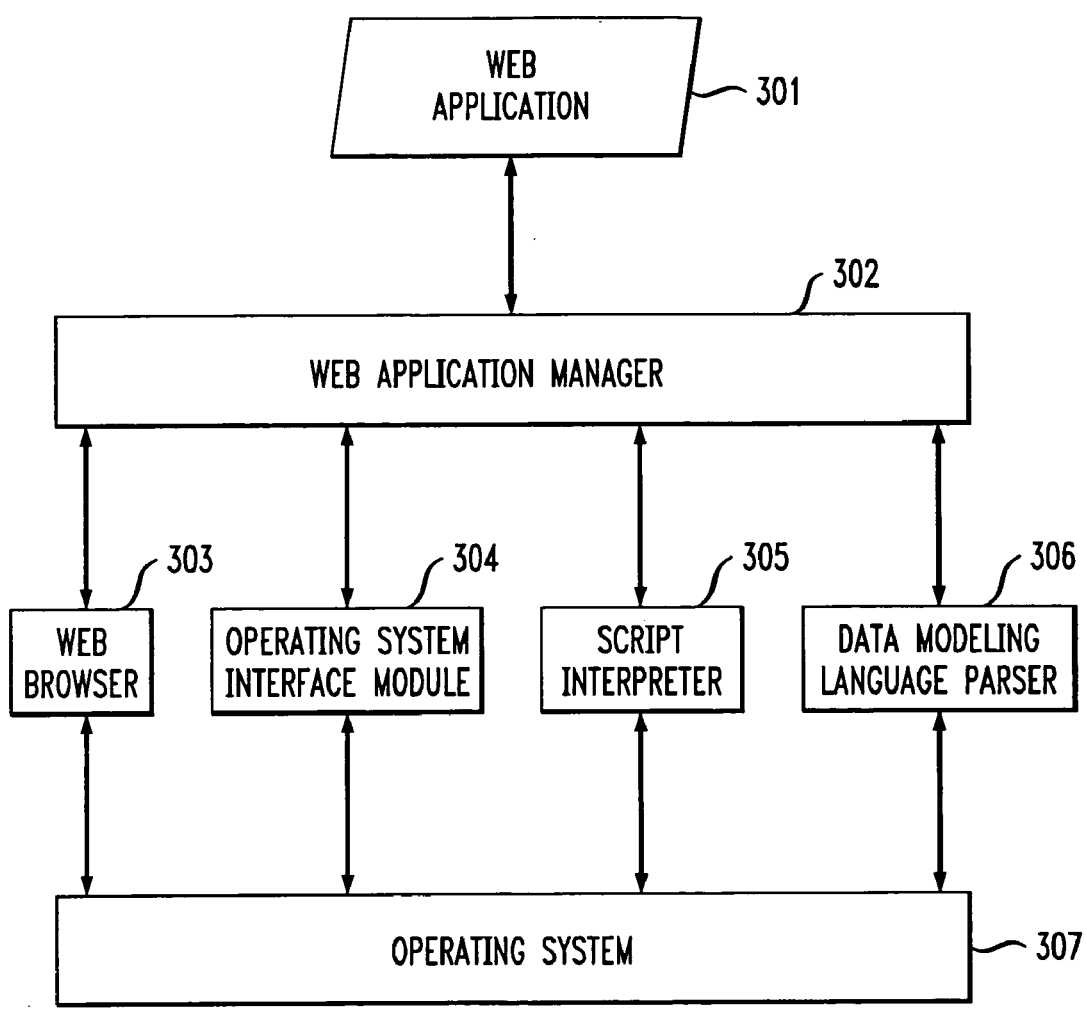
FIG. 3 is an example of an architecture of a web application process system of the present invention.
Figure 4:
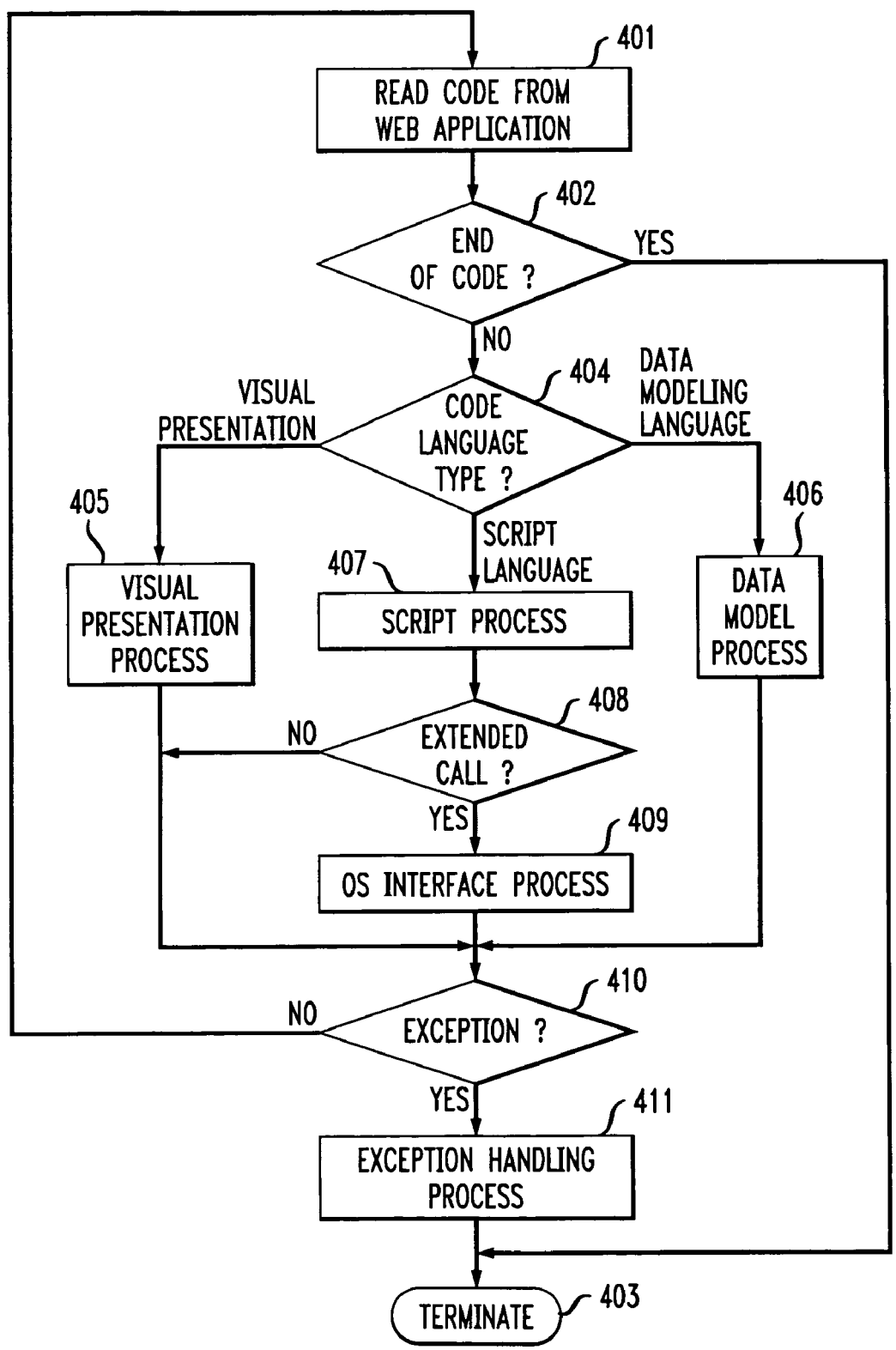
FIG. 4 is an example of a web application manager process of the present invention.

FIG. 3 depicts an overall software system architecture of a preferred embodiment of the present invention. In this embodiment, the software system having the features of the present invention comprises five software components. They are the web application manager 302, the web browser 303, the operating system interface module 304, the script interpreter 305 and the data modeling language parser 306. As depicted in FIG. 3, the four modules 303 through 306 can directly access operating system 307 resources by calling the operating system APIs (depicted as the four links between block 307 and the four modules 303 through 306, respectively). The web application manager 302 is the top-level module that executes web applications by driving the other four modules. It does so by taking a web application 301 as input and executes the various language codes in this application's web pages and invokes the other four modules (303 through 306). FIG. 4 provides a more detailed depiction of the process of the web application manager.

Those skilled in the art will appreciate that there are a number of ways for one software module to drive other software modules. For example, in an object-oriented approach, with all modules modeled as classes, a driving class can create an instance of a driven class and calls the methods associated with this driven class to invoke the behavior of the former. In a non-object-oriented approach, the driven modules can be invoked by the driving module through the API functions provided by the former.

Referring now to FIG. 4, the process of the web application manager is shown. As depicted in FIG. 4, the web application manager executes a web application by first reading the language code in the web pages of this application (step 401), and does not terminate (block 403) until all code has been processed (step 402). For each unit of code read, the web application manager determines the language type of this code (step 404).

If the language type of this code is visual presentation language, the web application invokes the visual presentation process (step 405) that takes this code as input. If the language type of this code is the data modeling language, the web application manager invokes the data modeling process (step 406) that takes this code as the input. If the language type is the script language, the web application manager invokes the script process (step 407) that takes this code as input.

When the visual presentation process (step 405) and the data modeling process (step 406) terminate, they return control back to the web application manager and indicate to the latter if an exception has occurred (step 410). If so, the web application manager invokes the exception handling process (step 411) and then terminates this execution (block 403). If no exception occurs, the web application manager goes on to read the next code unit (step 401).

When the script process (step 407) terminates and returns control back to the web application manager, it returns information about the script code it just processed in terms of whether this script code belongs to the original script language under the browser contexts; or it is extended code based on the features of the present invention to have access to a full range of operating system APIs (step 408). If this script code is part of the original web page script language, it had already been parsed, decoded, and executed by the script interpreter (module 305 in FIG. 3) in the script process (step 407). In this case, in this embodiment exemplified in FIG. 4, the web application goes on to check if an exception has occurred (step 410). If this script code is an extended call, then it has been parsed, decoded, but not executed by the script interpreter (module 305 in FIG. 3) in the script process (step 407). Instead, the decoded information of this script code is passed to the operating system interface process (step 409) for execution. When the operating system interface process (step 409) completes the execution for this script, it returns control back to the web application manager which then checks for an exception (step 410) and processes the exception handling process (step 411) if an exception has occurred, or, if not, goes on to read the next code unit (step 401). The details of the visual presentation process (step 405), the data modeling process (step 406), the script process (step 407) and the operating system interface process (step 408) are explained below in the context of FIGS. 5, 6, 7 and 8, respectively.

Figure 5:
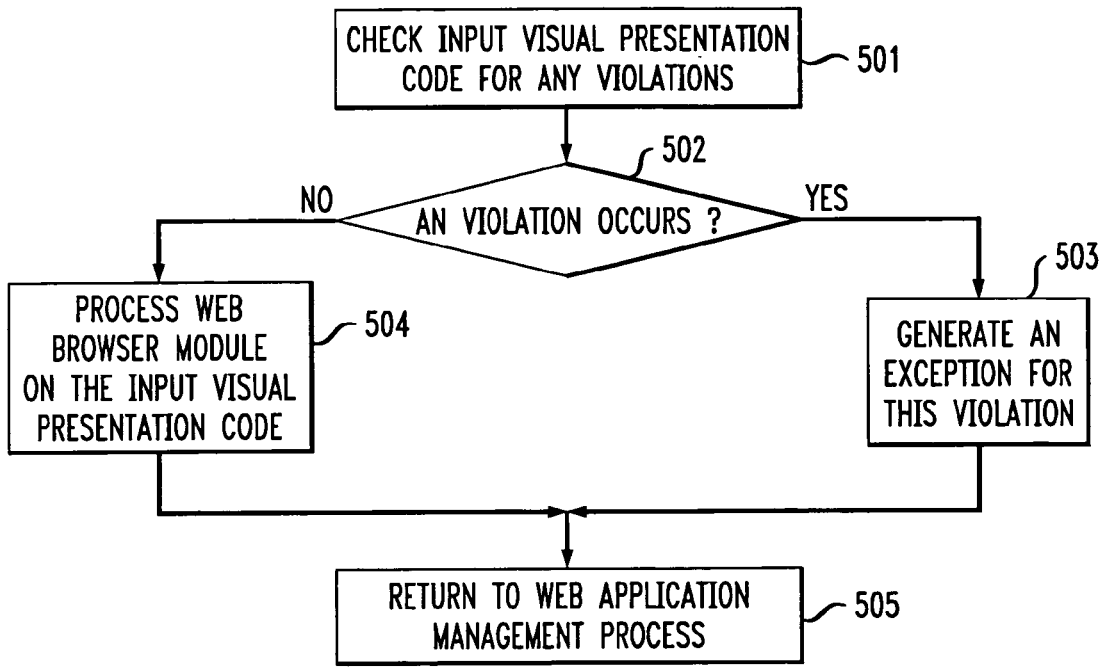
FIG. 5 is an example of a visual presentation process of the present invention.

FIG. 5 is a detailed depiction of the visual presentation process (step 405 in FIG. 4). As depicted in FIG. 5, the visual presentation process takes, as input, visual presentation code and checks to see if this code incurs any violations against the system policy as manifested by security and cache settings of the web application currently being executed (step 501). For example, one security setting for an application may regulate that it can only link to a fixed external URL (uniform resource locator). If in the visual presentation process of an HTML code of this application, a link different from that in the aforementioned setting exists, then this link causes a violation.

If a violation occurs (step 502), the visual presentation process generates an exception (step 503) and then returns this exception to the web application management process (step 505) depicted in FIG. 4. Those skilled in the art can appreciate that exceptions can be implemented in various ways, including for example using error codes and using objects of the object-oriented model to represent exceptions. If the input visual presentation code causes no violations, the visual presentation process passes this code to the web browser module for execution (step 504).

The web browser module (303 in FIG. 3) can be the web browser software available in most computers in the world. The most popular web browsers are Netscape™ and Microsoft's Internet Explorer™. These two web browsers serve as client programs that use the HTTP to make requests of web servers throughout the Internet on behalf of the browser user. They also provide a graphic user interface to display the retrieved web objects and to interact with the user by accepting user input. Those skilled in the art can appreciated that these two browser software packages can be incorporated by a software system using various methods, including for example linking and invoking APIs calls they provide or incorporating their source code for compilation. In a preferred embodiment of the present invention, the web application manager incorporates web browser software and drives it based on the processes depicted in FIGS. 3 and 4.

Figure 6:
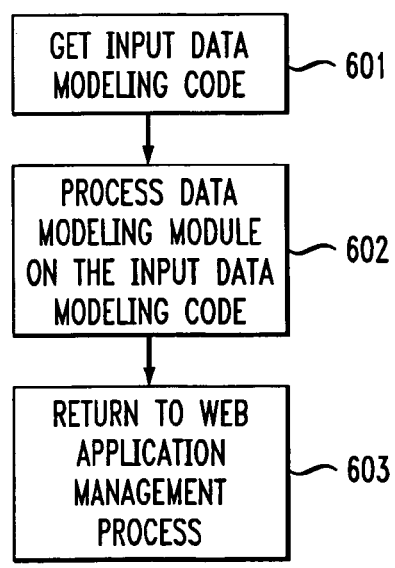
FIG. 6 is an example of a data model process of the present invention.

FIG. 6 is a detailed depiction of the data modeling process (step 406 in FIG. 4). As depicted in FIG. 6, the data modeling process takes, as input, data modeling code (step 601) and runs the data modeling module (306 in FIG. 3) to decode the data types and values encoded in the input data modeling code (step 602). After the data modeling module is completed, the data modeling process returns control back to the web application manager (step 603). Those skilled in the art will appreciate that currently the most commonly used data modeling language for web data is XML. The data modeling module processing (step 602) in this embodiment of FIG. 6 may therefore correspond to an XML parser. Similar to the web browser software, various versions of XML parser software are available to be incorporated by a software system using the aforementioned methods in incorporating the web browser software.

Figure 7:
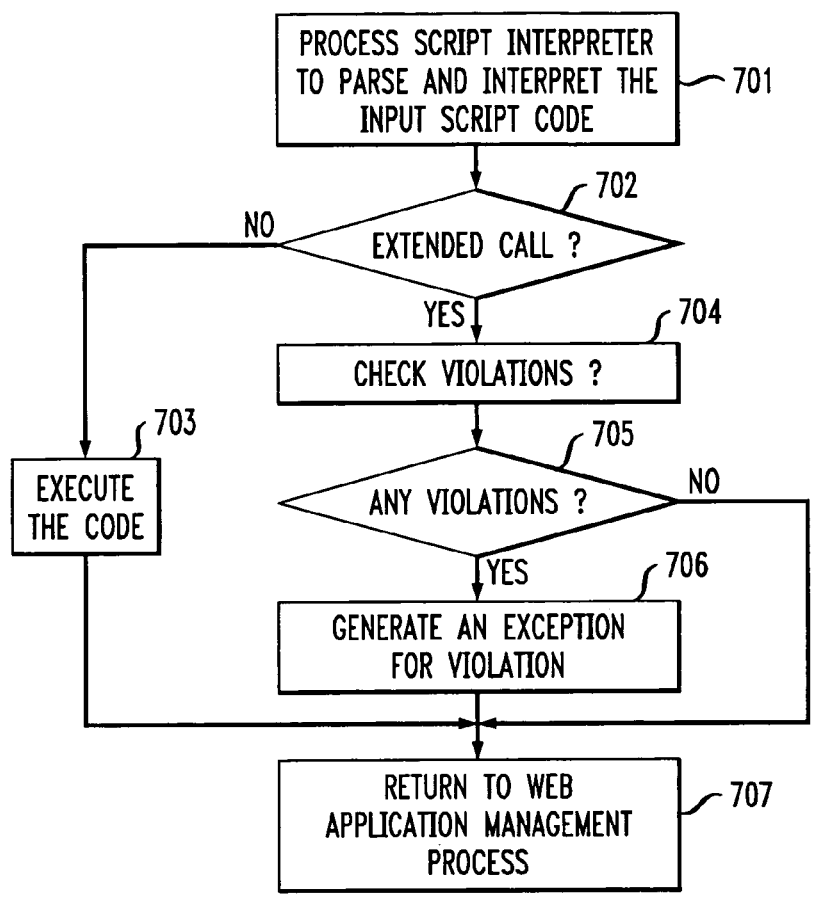
FIG. 7 is an example of a script process of the present invention.

FIG. 7 is a detailed depiction of the script process (step 407 in FIG. 4). As depicted in FIG. 7, the script process takes a script code as input, then parses and interprets this code (701). If the code is a function call, the script process checks to see if this function is a standard function that is under the web browser contexts or an extended function created based on the features of the present invention to access the operating system resources beyond the browser contexts (step 702). If the function being interpreted is a standard function, the script process executes it (step 703). If it is an extended function, without executing it, the script process checks to see if this function call would cause any violations against any management policies (step 704).

In a preferred embodiment of the present invention, an extended function can cause a management policy violation by requesting operating system resources that are configured by the system management to be beyond the access of the underlying web application. For example, the administrator of a software system having the features of the present invention can set a limit of disk storage quota for a specific application. During an execution of this application, if an extended script function call requests to allocate disk space that exceeds the disk quota for this application, this call then causes a management policy violation.

As depicted in FIG. 7, if a violation occurs (step 705), the script process generates an exception for this violation (step 706). Next, the script process terminates and returns control back to the web application manager (step 707).

Those skilled in the art will appreciated that currently the most commonly used scripting language for web pages is JavaScript. The parsing and interpreting process (step 701) and the executing step (step 703) in the script processing of this preferred embodiment of FIG. 7 may therefore correspond to the parsing, interpreting and executing processes of the JavaScript software. Similar to the web browser software, the JavaScript software can be incorporated by a software system using the aforementioned methods in incorporating the web browser software, and modified such that when an extended function call is parsed and interpreted, instead of attempting to execute this call, it returns and gives the information about this call to the web application manager, which then uses the information about this call as input and calls the operating system interface process (step 409 in FIG. 4) to execute it.

Figure 8:
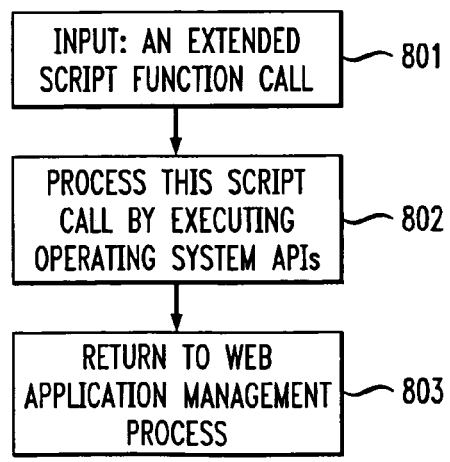
FIG. 8 is an example of an operating system interface process of the present invention.

Referring now to FIG. 8, the operating system interface process (step 409 in FIG. 4) that is called by the web application manager to execute an extended script call is shown. As depicted in FIG. 8, the operating system interface process takes an input which is information of an extended script function call (step 801) and, for each extended script call, it executes a regular code that was written with the native operating system APIs to perform the task of its associated script call (step 802). After the processing of the native operating system APIs for executing the script function call, the operating system interface process returns control to the web application manager (step 803).

Figure 9:
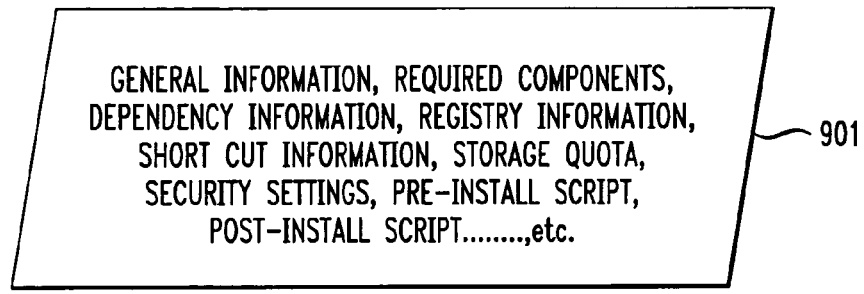
FIG. 9 is an example of an install document of the present invention.

FIG. 9 depicts an example 901 of an install document of an application used in accordance with the present invention to properly install this application. As depicted by FIG. 9, the install document of an application may include, but is not limited to, general information, various required components, dependency information, registry information, short cut information, storage quota, and security settings of this application.

Those skilled in the art will appreciate that the general information of an application may include, for example, the Global Unique ID, title, author, description, versions of this application. The required components of an application may include, for example, the icon of this application, HTML pages, scripts, and other documents required to run this application. The dependency information of an application may include, for example, all applications that this application depends on in order to execute. The registry information of an application may include, for example, all registry entries required for this application to execute properly. The short cuts for an application may include, for example, the directory or the location in the storage management system in which this application is to be stored, as well as all the links in the operating system graphic user interface from which the icon of this application is visible and can be used to directly invoke the running of this application. The storage quota for an application may include, for example, information that limits the maximum disk space which this application may use. The security information for an application may include, for example, the abilities of this application to access operating system resources, such as, for example, the abilities to spawn new processes, to connect to certain external hosts, to execute dynamic link library calls, to access file I/O (inputs/outputs), to create short-cuts and to access network and interface ports. The install document may also include pre-install and post-install scripts which are logic in the form of scripting language that is required to execute before and after the installation, respectively.

Figure 10:
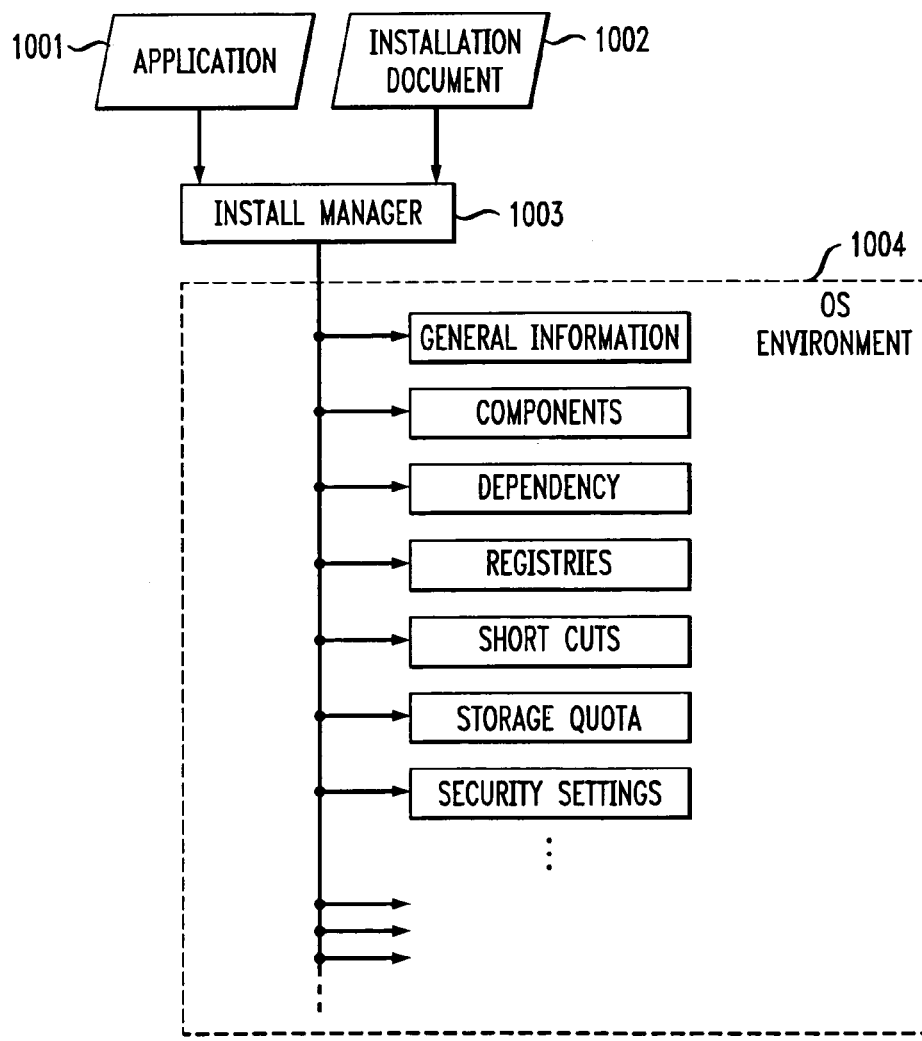
FIG. 10 is an example of an architecture of a system deploying the install manager of the present invention.

FIG. 10 depicts an example of the tasks performed by an install manager of the present invention. As depicted by FIG. 10, to install an application, the install manager or program 1003 of the present invention takes two inputs: the application to be installed (block 1001) and the install document for this application (block 1002). Next, the install program 1003 sets up each setting in the install document of this application (e.g., general information, components, dependency, etc.) in order to establish an operating system environment or context 1004 under which this application can be properly executed.

Figure 11:
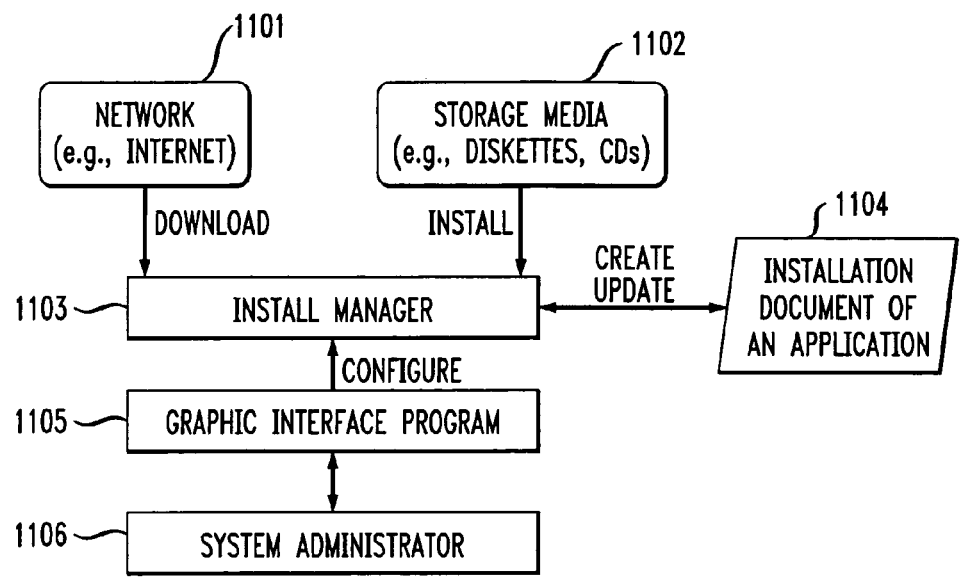
FIG. 11 is an example of a process of obtaining or updating an install document of the present invention.

FIG. 11 is an example depicting how the install manager 1103 having the features of the present invention can be deployed to create or update an install document 1104 for an application. As depicted by FIG. 11, an install document 1104 for an application can be downloaded from a network such as the Internet 1101. It can also be installed through storage media such as diskettes or CD-ROMs 1102. The install manager can also provide a graphic interface 1105 for the system administrator 1106 to configure an existing install document 1104. Those skilled in the art will appreciate that the install document for an application can be written in a data modeling language such as XML that is widely used for modeling electronic documents.

Figure 12:
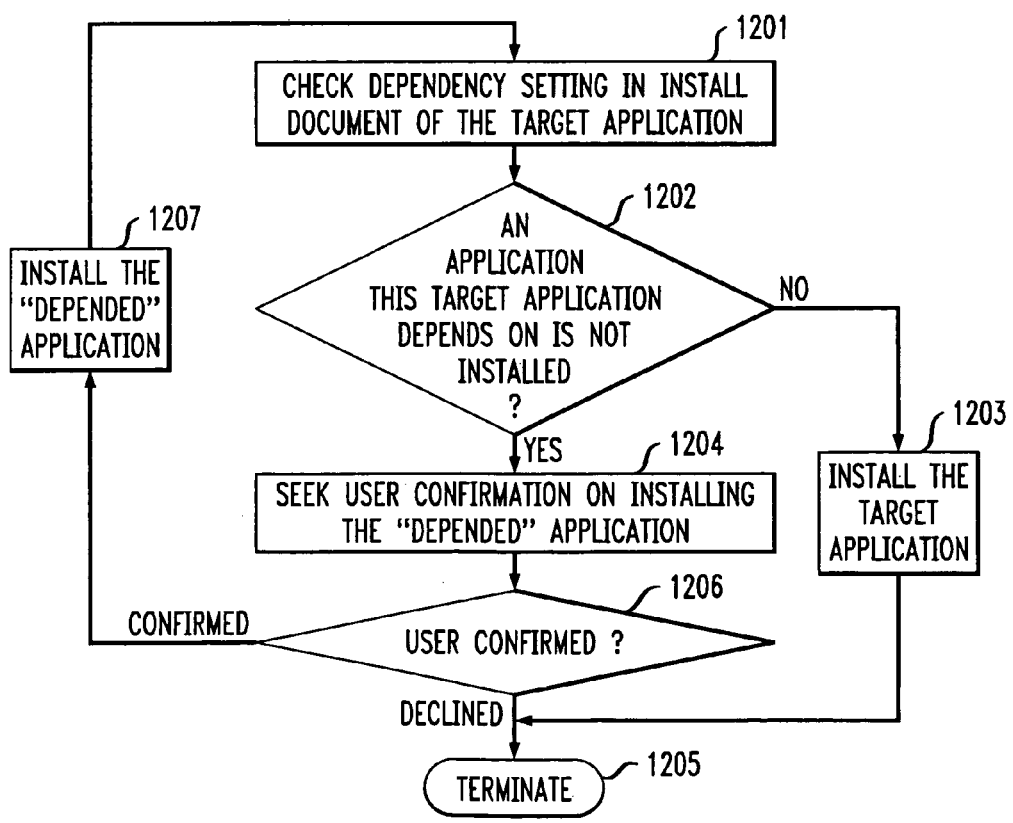
FIG. 12 is an example of a dependency install process of the present invention.

Referring now to FIG. 12, the dependency installation feature of an install manager of the present invention is shown. As depicted in FIG. 12, the install manager first checks the install document of the application to be installed (step 1201) to see if any applications this target application depends on are no yet installed (step 1202). If an application the target application depends on is not installed, the install manager may display a message about the "depended" application and ask for the user's confirmation to install this "depended" application first (step 1204). If the user confirms (step 1206), the install manager may go to the network to retrieve and install this "depended" application or asks the user to enter the proper portable storage media such as diskettes or CD-ROMs to install it (step 1207). If the user declines to install this "depended" application, the install manager terminates the installation process (step 1205). If all applications that the target application depends on are installed (step 1202), the install manager installs the target application (step 1203) before it terminates the installation process (step 1205).

Figure 13:
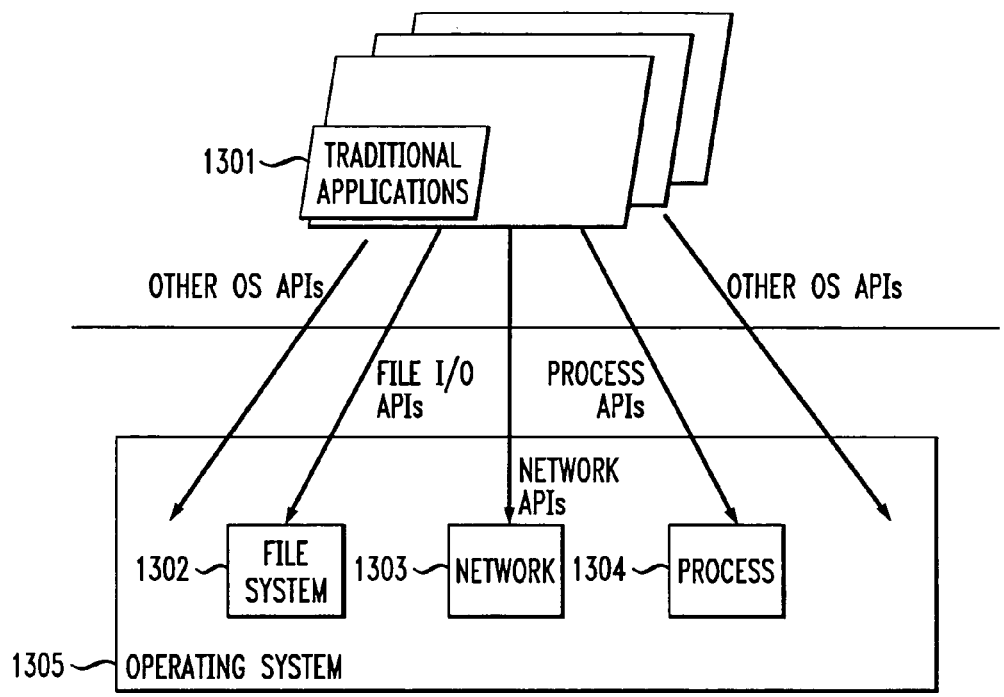
FIG. 13 is an example of a security context for traditional applications.

FIG. 13 depicts the security context of traditional applications, e.g., applications written in traditional 3GL/4GL programming languages. The security context of a traditional application is the limits of access to the operating system resources this application is restricted to. Traditional applications typically call operating system APIs to access operating system resources. As depicted by FIG. 13, traditional applications 1301 can call file I/O APIs to access the file system 1302. They can call network APIs to access the operating system's network services 1303. For process management, the applications may call process APIs to request operating system's process management services 1304. They can also call other operating systems' APIs to access other services provided by the operating systems. In general, in this type of system, the security context for an application is the entire operating system 1305.

In this security model, it is possible that a traditional application can, inadvertently or maliciously, damage not only its own data but those of other applications that share the same computer system through the call of operating system APIs.

Figure 14:
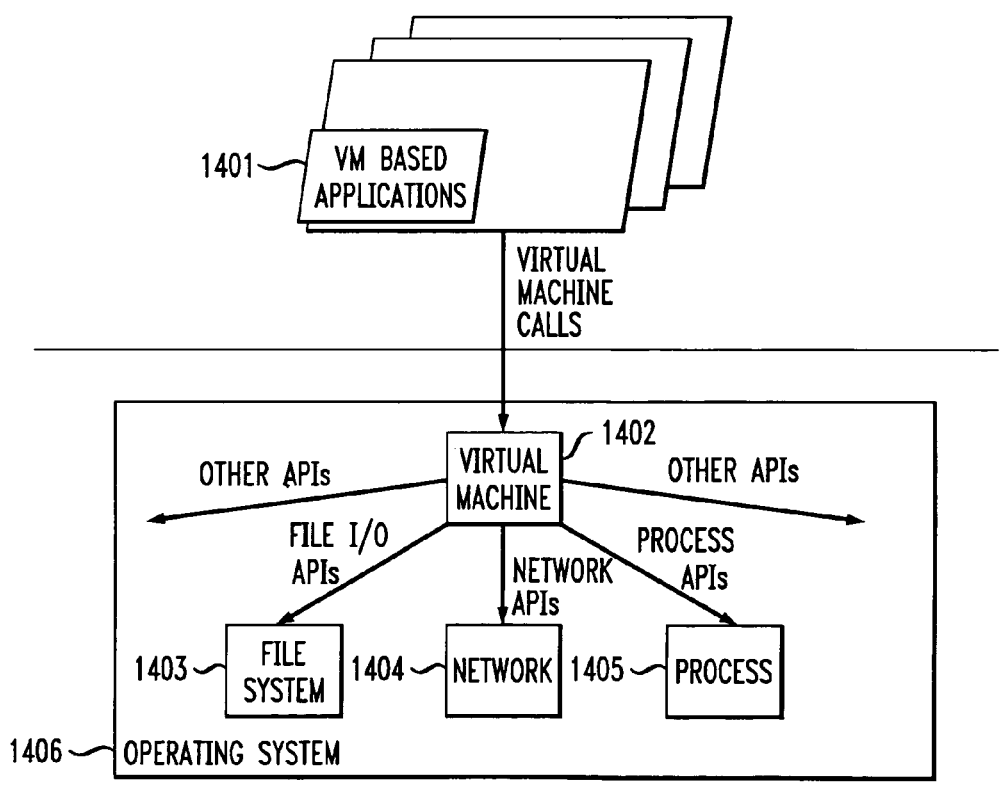
FIG. 14 is an example of a security context for virtual machine based applications.

FIG. 14 depicts the security context of virtual machine (VM) based applications. As depicted in FIG. 14, direct calling of operating system 1406 APIs from the applications is eliminated. Instead, applications 1401 request system resources through calls made to the virtual machine 1402. It is the virtual machine 1402 that makes the operating systems' APIs access operating system services such as the file system 1403, network services 1404, process services 1405, and other operating system services on behalf of the applications.

In a virtual machine environment, such as the Java™ Virtual Machine, the security context of an application (such as a Java™ program) is therefore defined by the virtual machine. A misbehaving application thus can only create external damage allowable by the virtual machine. However, there can be many different types of applications running on the same virtual machine and while each one of them may have a different security need, they are forced to run under the same security context (that defined by the virtual machine).

Figure 15:
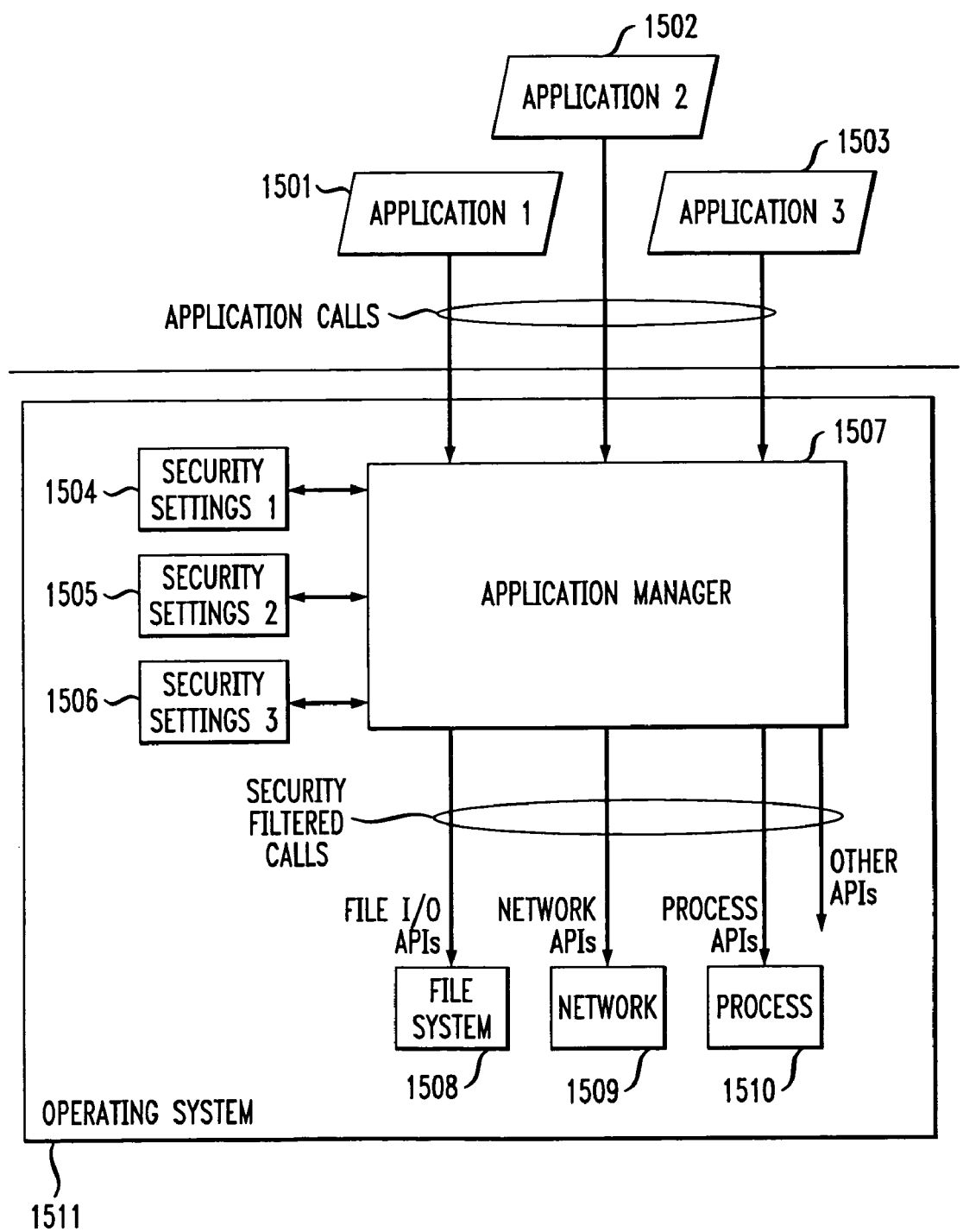
FIG. 15 is an example of a security context for applications managed by a system of the present invention.

Referring now to FIG. 15, an example of an architecture of a security management system of the present invention is shown. As depicted by the example in FIG. 15, instead of sharing one security context, applications each may have a unique list of security settings that define the security context for each application. In FIG. 15, the security context for application 1 (1503) is defined by security settings 1 (1504); the security context for application 2 (1502) is defined by security settings 2 (1505); and the security context for application 3 (1503) is defined by security settings 3 (1506).

Based on this preferred embodiment of the present invention, applications calls that request operating system 1511 resources from the applications go through the application manager 1507 for security filtering. For example, upon receiving a call from application 1 (1501), the application manager 1507 checks the security settings of this application (1504) and makes sure that this call does not violate any of the security settings before it can be executed. The security filtered calls may then be passed onto the APIs associated with the file system 1508, the network services 1509 and the process services 1510 of the operating system 1511.

Figure 16:
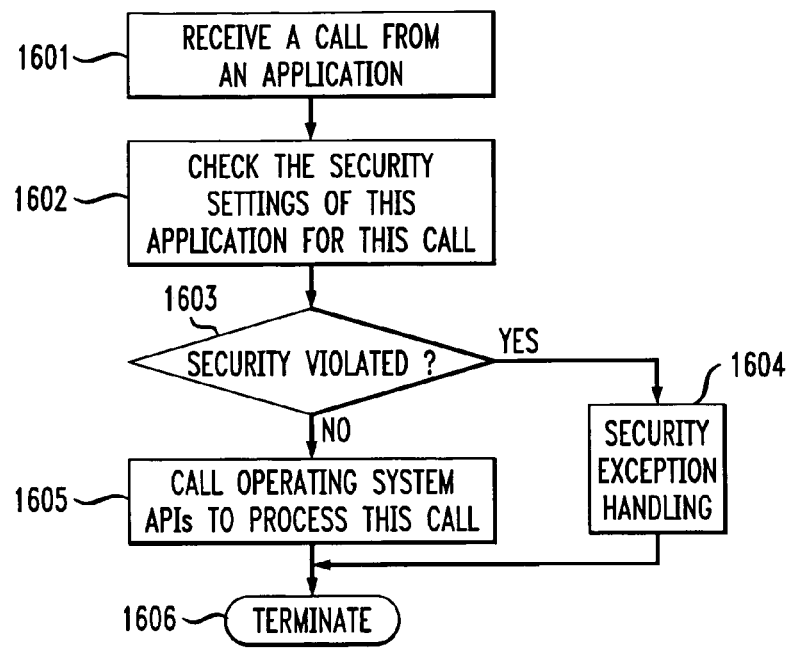
FIG. 16 is an example of a security manager process of the present invention.

FIG. 16 depicts a security filtering process of the application manager (1507 in FIG. 15) having the features of the present invention. As depicted by FIG. 16, the application manager first receives a call from an application (step 1601). Next, it checks the security settings of this application for this call (step 1602).

If a violation against the security settings exists for this call (step 1603), the application manager may initiate a security exception handling step (step 1604) before it terminates the process (step 1606) without executing this call. A typical action to handle an exception may be to display an error message and then exit the processing for the application that caused this exception. If no violations exist (step 1603), the application manager processes this call by executing operating system APIs (step 1605) before it terminates the process (step 1606).

Figure 17:
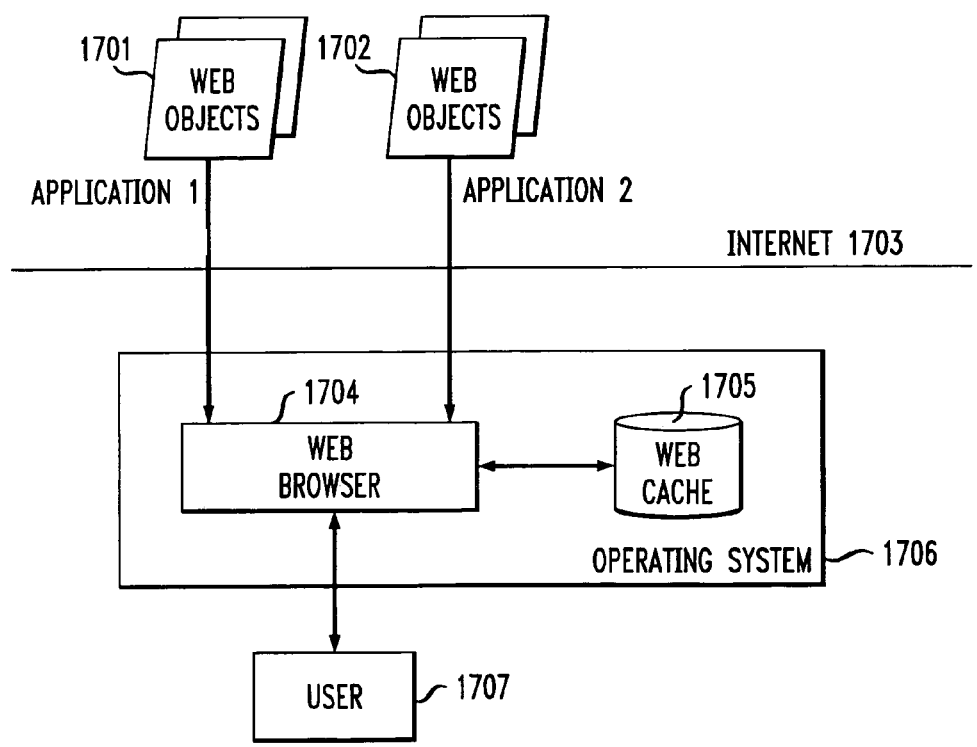
FIG. 17 is an example of an architecture of a web caching system of traditional web applications.

Referring to FIG. 17, an architecture is shown of a web caching system deployed by state-of-the-art browsers in processing applications which comprise web pages. As depicted in FIG. 17, a user 1707 may use the browser 1704 to process applications (1701, 1702), such as a web-based online purchasing application, or to simply display Web pages. The web caching system in this model is based on one cache 1705 for all HTTP web objects displayed through this browser 1704.

Based on this model, when the user requests a HTTP web object through the web browser 1704, the browser first checks its cache 1705 to see if the requested web object exists in the cache (as shown, the web browser and cache are associated with operating system 1706). If so, the browser retrieves this object from the cache. If not, the browser goes to the source host of this object on the Internet 1703 and retrieves it through the Internet. In this case, the browser may also insert this newly retrieved object in its cache.

For web browsers and web proxies that deploy a conventional web caching system, such as the one depicted in FIG. 17, certain strategies may be used to remove objects from the cache that are deemed out of date. One strategy may be to retrieve the meta-data from the Internet source of the requested object and compare that with the meta-data of the same data in the cache to determine if the cached one is outdated. Another strategy may be to set a time window and to re-retrieve or to process the meta-data comparison based on the above strategy for any objects that have been cached longer than this time window. A third strategy may be to do nothing and only to retrieve an object through the Internet if it is not found in the cache or when the user requests so by pressing the Reload button on the browser screen.

It is to be appreciated that cache coherency algorithms are not a feature of the present invention, hence any reasonable cache coherency algorithm can be deployed by a web caching system of the present invention, as explained below in the context of FIG. 18.

Figure 18:
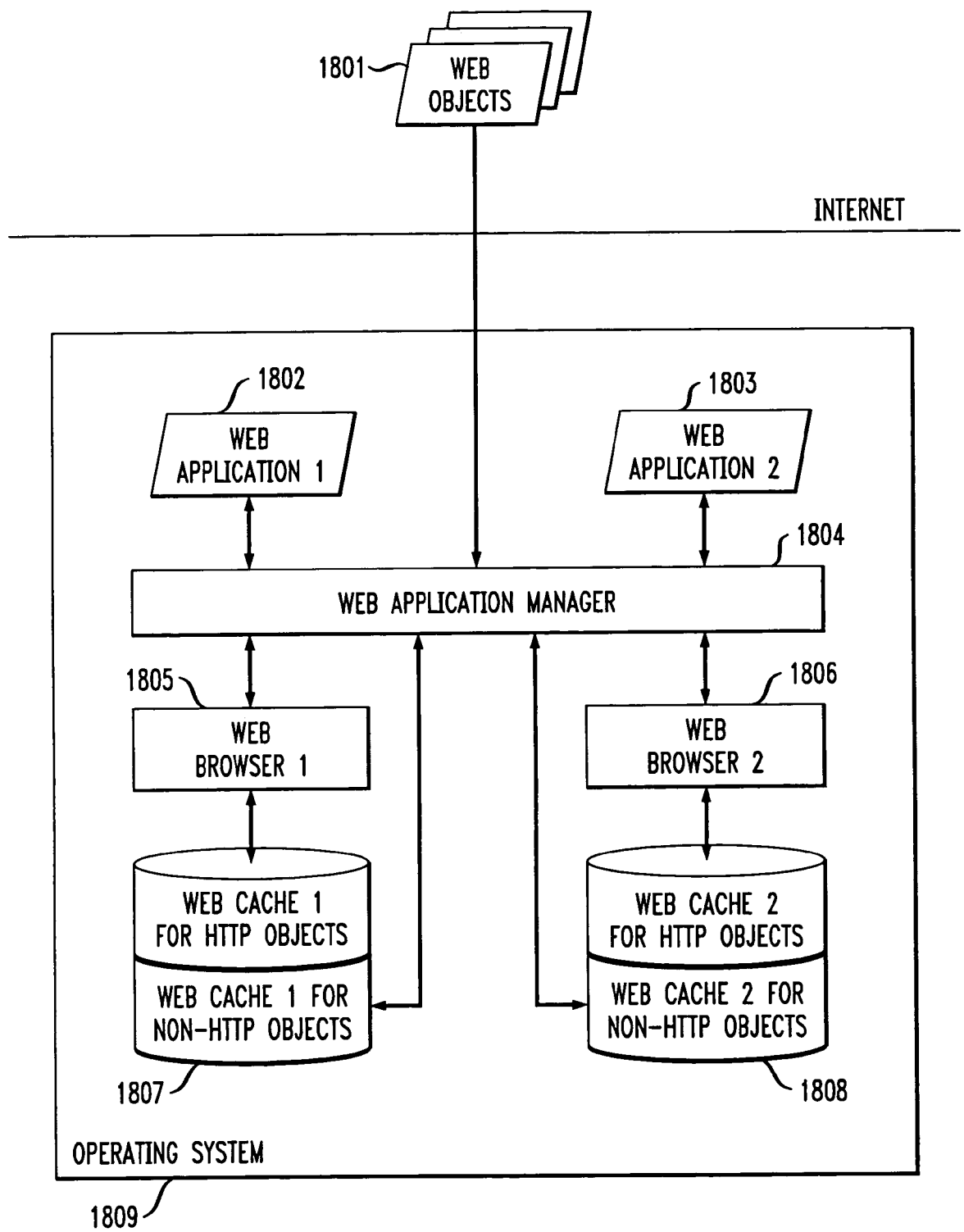
FIG. 18 is an example of the architecture of a web caching system for web applications of the present invention.

FIG. 18 depicts an architecture of a web caching system of the present invention. As depicted in FIG. 18, web objects (1801) are retrieved via the Internet by the web application manager (1804). For each web application (1802 or 1803), the web application manager creates a separate web cache (1807 or 1808). In a preferred embodiment of the present invention, the web cache for an application contains two pools, one for HTTP objects and the other one for non-HTTP objects. In this preferred embodiment, the web application manager runs a separate copy of the web browser software (1805 or 1806) for each web application, and uses the web browser's web caching system to cache HTTP objects for each application. Those skilled in the art can appreciate that browser software can be incorporated by the present invention using various methods, including for example linking and invoking APIs calls they provide or incorporating their source code for compilation. Alternatively, the web application manager can be developed with the capabilities to create and manage a cache for HTTP objects for each application without the incorporation of the browser's caching system.

In a preferred implementation of the present invention, the web application manager provides cache management APIs to web applications to let them manage their own caches for non-HTTP objects. Each web application can manage a separate cache for non-HTTP web objects by issuing these cache management APIs. Upon receiving these API calls, the web application manager may then, on behalf of the application issuing these calls, conduct cache management tasks directly using the native operating system 1809 APIs.

Figure 19:
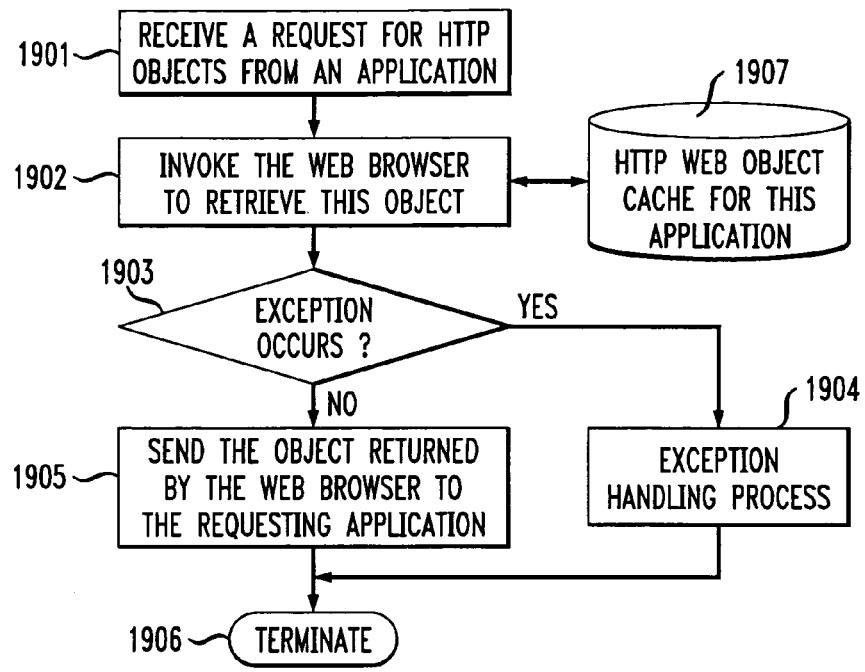
FIG. 19 is an example of a web caching management process utilizing a web browser caching mechanism of the present invention.

FIG. 19 depicts an example of an HTTP web object retrieval process of a web application manager having the features of the present invention. As depicted by FIG. 19, the web application manager first receives a request for an HTTP web object from an application (step 1901). Next, the web application manager invokes web browser software to retrieve this HTTP web object (step 1902). The web browser will retrieve this HTTP web object by first checking its web cache 1907. If the web browser returns an exception in retrieving this object (step 1903), the web application manager invokes the exception handling process (step 1904) before it terminates the process (step 1906). If no exception occurred (step 1903), the web application manager sends the object returned by the browser to the requesting application (step 1905) and then terminates the process (step 1906).

Figure 20:
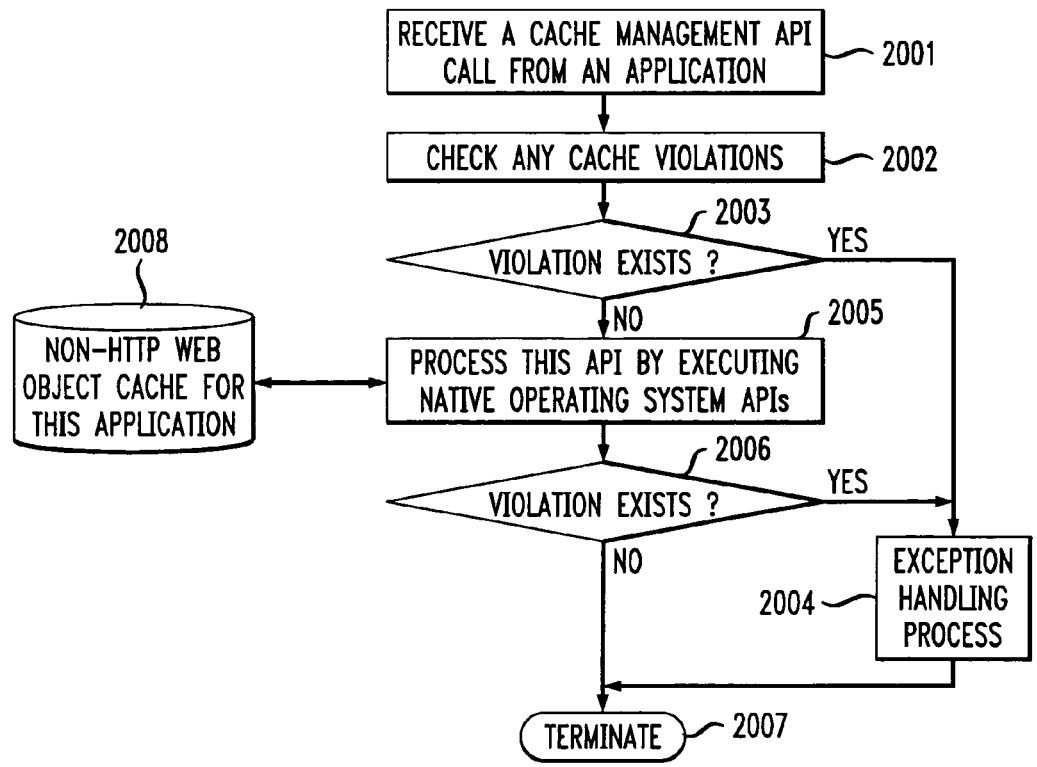
FIG. 20 is an example of a web caching management process for web applications of the present invention to manage their own caches.

FIG. 20 depicts a process of the web application manager of the present invention that executes non-HTTP web object cache management APIs. According to the present invention, a web application manages its own non-HTTP web object cache by calling cache management APIs. As depicted in FIG. 20, upon receiving a cache management API call (step 2001), the web application manager first checks to see if this API call will result in any violations against the cache settings for the application that issues this call (step 2002). For example, a cache violation may be caused by a cache management API requesting space for its non-HTTP object cache that will result in the total storage space for the whole application exceeding that allowed for this application.

If a violation occurs (step 2003), the web application manager invokes the exception handling process (step 2004) to handle this violation. A typical action may be to display an error message and then exit the processing for the application that caused this error. Next, if no violations occur (step 2003), the web application manager processes this API by executing native operating system APIs (step 2005) that directly manage the non-HTTP object cache 2008 for this application. Next, if any exceptions exist during the cache management (step 2006), the exception handling process is invoked (step 2004). Otherwise, the API processing is complete and the process terminates (step 2007).

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of generating a web-based application, the method comprising the steps of:
   composing one or more web pages in accordance with a scripting language to form the application;
   embedding one or more extended function calls in the one or more web pages in accordance with the scripting language such that the application, when executed by a computer system in which the application is installed, has access to one or more operating system resources of the computer system that are not associated with a context of a web browser through the one or more extended function calls;
   wherein the one or more embedded extended function calls cause one or more application programming interfaces of an operating system to be executed in order to access the one or more operating system resources that are not associated with a context of a web browser; and
   providing an application manager that manages a life-cycle associated with the web-based application in accordance with the computer system, wherein the application manager is operative to: (i) process code in each web page of the application; (ii) invoke the web browser to process code that is of a visual presentation type; (iii) invoke a data modeling language parser to parse code that is of a data modeling language type; (iv) invoke a scripting language interpreter to parse code that is of the scripting language type such that the scripting language interpreter may execute code that is of the original scripting language type used by the web browser; and (v) invoke an operating system interface module to execute code, successfully parsed by the scripting language interpreter, that executes the one or more application programming interfaces.

2. The method of claim 1, wherein the scripting language includes code for accessing one or more operating system resources of the computer system that are associated with a context of a web browser.

3. A software system for processing a web-based application in accordance with a computer system, the software system comprising:
   an application manager that manages a life-cycle associated with the web-based application in accordance with the computer system, wherein the application is composed of one or more web pages and has access to one or more operating system resources of the computer system that are not associated with a context of a web browser;
   a scripting language interpreter that interprets scripting language associated with the one or more web pages of the application; and
   an operating system interface module which converts one or more calls embedded in the interpreted scripting language associated with the one or more web pages into code that executes one or more application programming interfaces so as to access the one or more operating system resources of the computer system that are not associated with a context of a web browser;

wherein the application manager is operative to: (i) process code in each web page of the application; (ii) invoke the web browser to process code that is of a visual presentation type; (iii) invoke a data modeling language parser to parse code that is of a data modeling language type; (iv) invoke the scripting language interpreter to parse code that is of the scripting language type such that the scripting language interpreter may execute code that is of the original scripting language type used by the web browser; and (v) invoke the operating system interface module to execute code, successfully parsed by the scripting language interpreter, that executes one or more application programming interfaces.

4. The software system of claim 3, further comprising a web browser to at least one of retrieve web objects, send web requests, and provide a graphical user interface in accordance with the execution of the web-based application.

5. The software system of claim 3, further comprising a data modeling language parser to decode information in the web-based application written in a corresponding data modeling language.

6. The software system of claim 5, wherein the data modeling language parser is an XML parser.

7. The software system of claim 3, wherein the scripting language is JavaScript™.

8. The software system of claim 3, wherein the scripting language interpreter is a JavaScript™ interpreter.

9. A software system for processing a web-based application in accordance with a computer system, the software system comprising:

an application manager that manages a life-cycle associated with the web-based application in accordance with the computer system, wherein the application is composed of one or more web pages and has access to one or more operating system resources of the computer system that are not associated with a context of a web browser;

a scripting language interpreter that interprets scripting language associated with the one or more web pages of the application;

an operating system interface module which converts one or more calls embedded in the interpreted scripting language associated with the one or more web pages into code that executes one or more application programming interfaces so as to access the one or more operating system resources of the computer system that are not associated with a context of a web browser, wherein the one or more operating system resources of the computer system that are not associated with a context of a web browser comprise a screen display outside of a window of the web browser;

a web browser; and a data modeling language parser;

wherein the application manager is operative to: (i) process code in each web page of the application; (ii) invoke the web browser to process code that is of a visual presentation type; (iii) invoke the data modeling language parser to parse code that is of a data modeling language type; (iv) invoke the scripting language interpreter to parse code that is of the scripting language type such that the scripting language interpreter may execute code that is of the original scripting language type used by the web browser; and (v) invoke the operating system interface module to execute code, successfully parsed by the scripting language interpreter, that executes the one or more application programming interfaces.

10. A software system for processing a web-based application in accordance with a computer system, the software system comprising:

an application manager that manages a life-cycle associated with the web-based application in accordance with the computer system, wherein the application is composed of one or more web pages and has access to one or more operating system resources of the computer system that are not associated with a context of a web browser;

a scripting language interpreter that interprets scripting language associated with the one or more web pages of the application;

an operating system interface module which converts one or more calls embedded in the interpreted scripting language associated with the one or more web pages into code that executes one or more application programming interfaces so as to access the one or more operating system resources of the computer system that are not associated with a context of a web browser, wherein the one or more operating system resources of the computer system that are not associated with a context of a web browser comprise a file management system;

a web browser; and a data modeling language parser;

wherein the application manager is operative to: (i) process code in each web page of the application; (ii) invoke the web browser to process code that is of a visual presentation type; (iii) invoke the data modeling language parser to parse code that is of a data modeling language type; (iv) invoke the scripting language interpreter to parse code that is of the scripting language type such that the scripting language interpreter may execute code that is of the original scripting language type used by the web browser; and (v) invoke the operating system interface module to execute code, successfully parsed by the scripting language interpreter, that executes the one or more application programming interfaces.

* * * * *